US006467942B2

(12) United States Patent
Alloway et al.

(10) Patent No.: US 6,467,942 B2
(45) Date of Patent: Oct. 22, 2002

(54) AUTOMOTIVE LAMP SOCKET

(75) Inventors: Michael J. Alloway, Canton, MI (US); Earl J. Hayes, South Lyon, MI (US); Christopher J. Dillon, Dearborn Heights, MI (US); Thomas F. Rahrig, Woodhaven, MI (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

(21) Appl. No.: 09/837,685

(22) Filed: Apr. 18, 2001

(65) Prior Publication Data

US 2002/0093830 A1 Jul. 18, 2002

Related U.S. Application Data

(60) Provisional application No. 60/261,657, filed on Jan. 12, 2001.

(51) Int. Cl.[7] .................................................. B60Q 1/00

(52) U.S. Cl. ........................ 362/549; 362/226; 362/267; 439/699.2

(58) Field of Search ................................. 362/226, 548, 362/549, 390, 267; 439/699.2, 557, 558, 56, 414, 419; 313/318.01, 318.06, 318.09

(56) References Cited

U.S. PATENT DOCUMENTS 4,573,754 A 3/1986 Hill ............................. 339/60
4,777,573 A * 10/1988 Liao ........................... 362/249
4,940,422 A 7/1990 Forish et al. ............... 439/356
4,958,429 A 9/1990 Forish et al. ................. 29/877
5,000,702 A 3/1991 Forish et al. ............... 439/699
5,087,213 A 2/1992 Drapcho et al. ............ 439/672
5,660,560 A * 8/1997 Cheng et al. ............... 439/419
5,709,450 A * 1/1998 Francis et al. ......... 362/318.01
5,759,062 A * 6/1998 Chen .......................... 439/419
5,876,236 A * 3/1999 Chen .......................... 439/419
6,250,970 B1 * 6/2001 Key et al. ................ 439/699.2
6,328,593 B1 * 12/2001 Chang ........................ 439/419

* cited by examiner

*Primary Examiner*—Thomas M. Sember
(74) *Attorney, Agent, or Firm*—Tracey D. Beiriger

(57) ABSTRACT

A lamp assembly for use with a vehicle's electrical system, the electrical system including a plurality of terminals each having a wire insulating portion and an end connector portion. A main elastomeric housing includes a socket for receiving a bulb. A front seal encircles an exterior surface of the socket and seals around a periphery of the socket. A first plurality of sealing ridges extend along an open facing side of the main housing, opposite the bulb socket, and within which are received the wire insulating portions of the terminals and the end connector portions of each terminal conmmunicating with the bulb socket upon the terminals being located within the main housing. A back cap matingly aligns over an open facing side of the main housing and includes an opposingly facing side with a second plurality of sealing ridges which align with the first plurality of sealing ridges and to sandwich therebetween the wire insulating portions of the terminals. An inlet seal is seatingly received between aligning recesses defined between the opposingly facing sides of the main housing and the back cap and is located proximate the first and second pluralities of sealing ridges. Wire receiving apertures extend through the seal and into which are inserted the wire insulating portions of the terminals. An ultrasonic welding operation secures the back cap to the main elastomeric housing in a seal-tight manner.

10 Claims, 3 Drawing Sheets

AUTOMOTIVE LAMP SOCKET

CROSS REFERENCE TO RELATED APPLICATIONS

The present invention claims priority of provisional application Serial No. 60/261,657, filed Jan. 12, 2001, for Automotive Lamp Socket.

FIELD OF THE PRESENT INVENTION

The present invention relates generally to automotive lamp socket designs. More specifically, the present invention is an auto lamp socket construction incorporating a wire inlet and silicone sealant, which, when combined with ultrasonic welding of an elastomeric housing and a back cap element, exhibits improved sealing characteristics at the interface between the lamp socket and lighting assembly, as well as between the wires and the lamp socket. The present invention also provides an improved lamp socket design with a reduced part count.

DESCRIPTION OF THE PRIOR ART

Existing technologies for automotive lamps consist of assemblies of plastic, metal and elastomeric type materials. The lamp socket is connected to the vehicle electrical system, via electrical conductors (i.e., wire and terminals) and a main requirement of the lamp construction is the ability to seal out moisture, such being a common environmental consideration in automotive application.

U.S. Pat. No. 4,940,422, issued to Forish et al., discloses an automotive lamp socket assembly having a housing, contact insert and body. The contact insert is captured in a cavity defined within the housing by the body, which is in turn welded to the housing. Lugs on the body secure the assembly to a panel. A seal is placed between a flange on the housing and the panel to seal the assembly to a panel. Contacts are retained in the contact insert by engagement of U-shaped portions in slots of the contact inserts. Blade terminals are inserted through windows in the housing, contact insert, and contacts to interlock the terminals with the contacts and to keep the contacts secured in their positions. A socket connector is sealingly secured to the housing and prevents moisture from entering the housing. Reference is also made to U.S. Pat. Nos. 4,958,429 and 5,000,702, both claiming priority from the U.S. Pat. No. 4,940,422 patent, and which illustrate additional variations of this design.

U.S. Pat. No. 5,087,213, issued to Drapcho, teaches a lamp socket for a lamp bulb having a contact base that includes a right angle/single piece plastic socket portion with a tubular part into which a metallic ring-like member is inserted. The ringlike member serves the dual purpose of a lamp bulb retainer as well as the ground contact for the lamp bulb. It is also noted that Drapcho teaches the use of a seal independent of the socket assembly.

Finally, U.S. Pat. No. 4,573,754, issued to Hill, teaches a lamp assembly for automotive tail lamps and which includes a base member constructed of a relatively soft elastomeric material, a connector of a relatively hard material adapted to be sealingly but reasonably plugged into a cavity opening in one face of the base member, and a bulb socket of a relatively hard material adapted to be sealingly but reasonably plugged into another cavity in the base opening in a face which is normal to the face in which the connector is received. Conductors extend in parallel fashion in the base member between the socket cavity and the connector cavity.

The conductors make electrical connection at their one ends with contacts on the lower end of the socket and pass sealingly through a partition separating the two cavities where their other ends make electrical contact with terminals carried by the connector and so that the connector, base and socket provide a measure of moisture resistance to the lamp assembly.

SUMMARY OF THE PRESENT INVENTION

The present invention is a lamp assembly for use with a vehicle's electrical system and which is an improvement over the prior art in that it provides an improved assembly for sealing the interfaces between the vehicle's lamp socket and lighting assembly, as well as between the interface between the terminal wires of the electrical system and the lamp socket. The lamp assembly of the present invention further provides an improved sealing construction with the added feature of substantially reduced part content.

The lamp assembly includes a main elastomeric housing having a socket for receiving a bulb, a front seal encircling an exterior surface of the socket, and a first plurality of sealing ridges extending along an open facing side. Laid within the sealing ridges are wire insulating portions of a plurality of terminals belonging to the vehicle electrical system. Each of the terminals further includes an end connector portion, secured to an end of an associated wire insulating portion, and communicating with the bulb socket upon the terminals being located within the main housing.

A back cap, likewise constructed of a plasticized and elastomeric material, matingly aligns over the open facing side of the main housing. The back cap includes an opposingly facing side with a second plurality of sealing ridges defined therein, and which aligns with the first plurality of sealing ridges to sandwich therebetween the wire insulating portions of the terminals laid within the main housing.

An inlet seal is constructed of a specified three-dimensional shape and which is seatingly received between aligning recesses defined between the main housing and the back cap in proximity to the first and second pluralities of sealing ridges. Wire receiving apertures extend through the inlet seal and communicate with a selected edge location of the seal by split seal edges defined within the seal. The wire insulating portion of each terminal is depressingly engaged through a split seal and into an associated receiving aperture. In a final assembly, step, an ultrasonic or vibration welding operation is performed for sealingly engaging the back cap to the main elastomeric housing.

In a preferred embodiment, pluralities of three sealing ridges are defined, respectively, along each of the main housing and the back cap. The inlet seal further includes first, second and third wire receiving apertures for receiving, respectively, specified locations of the wire insulating portions corresponding to the first, second and third terminals. Both the front seal and the terminal inlet seal are further preferably constructed of a silicone material and so as to provide the necessary characteristics of elasticity and watertight sealability.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENT

Figure 1:
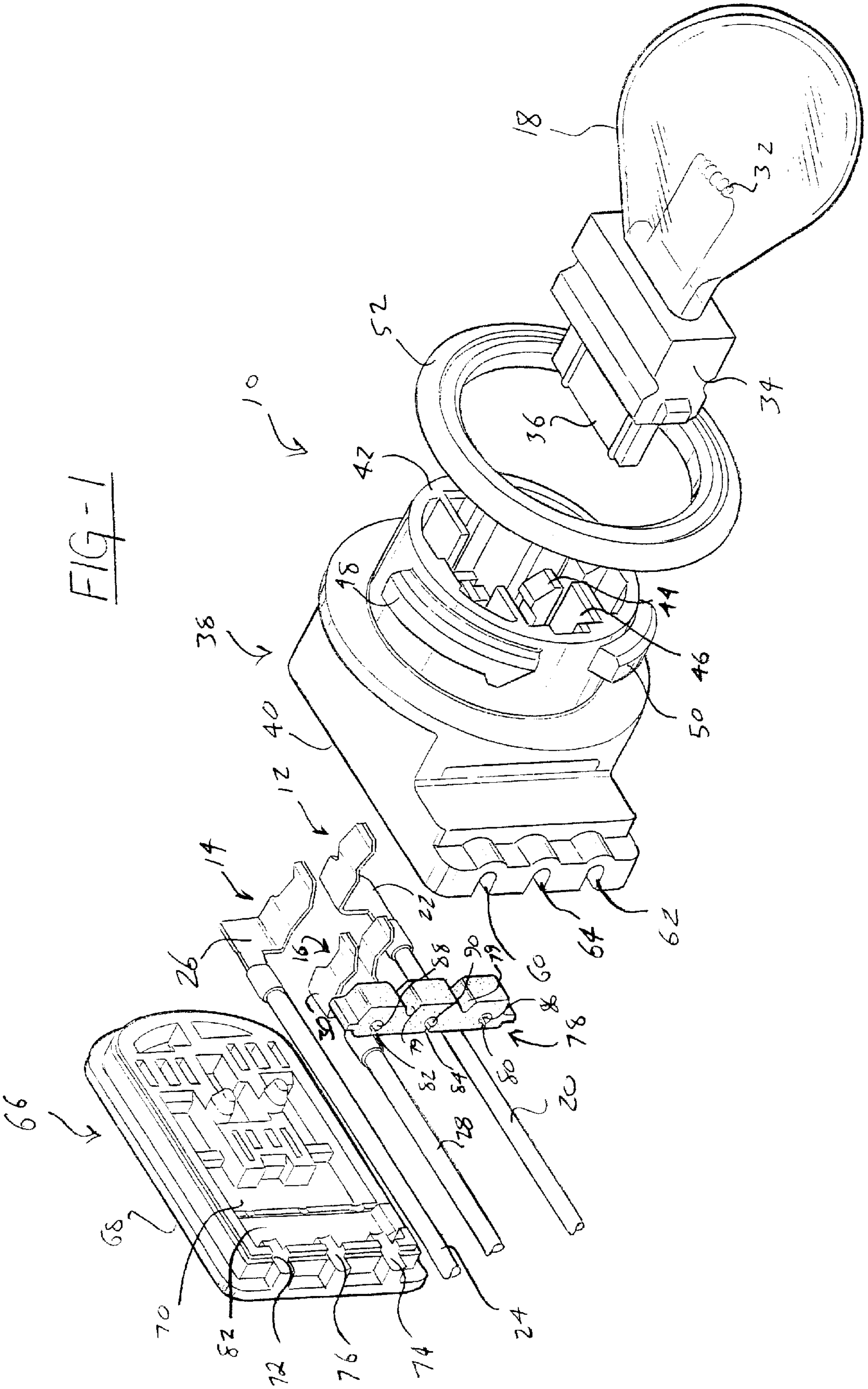
FIG. 1 is an exploded view of the vehicle lamp assembly according to the preferred embodiment of the present invention.
Figure 2:
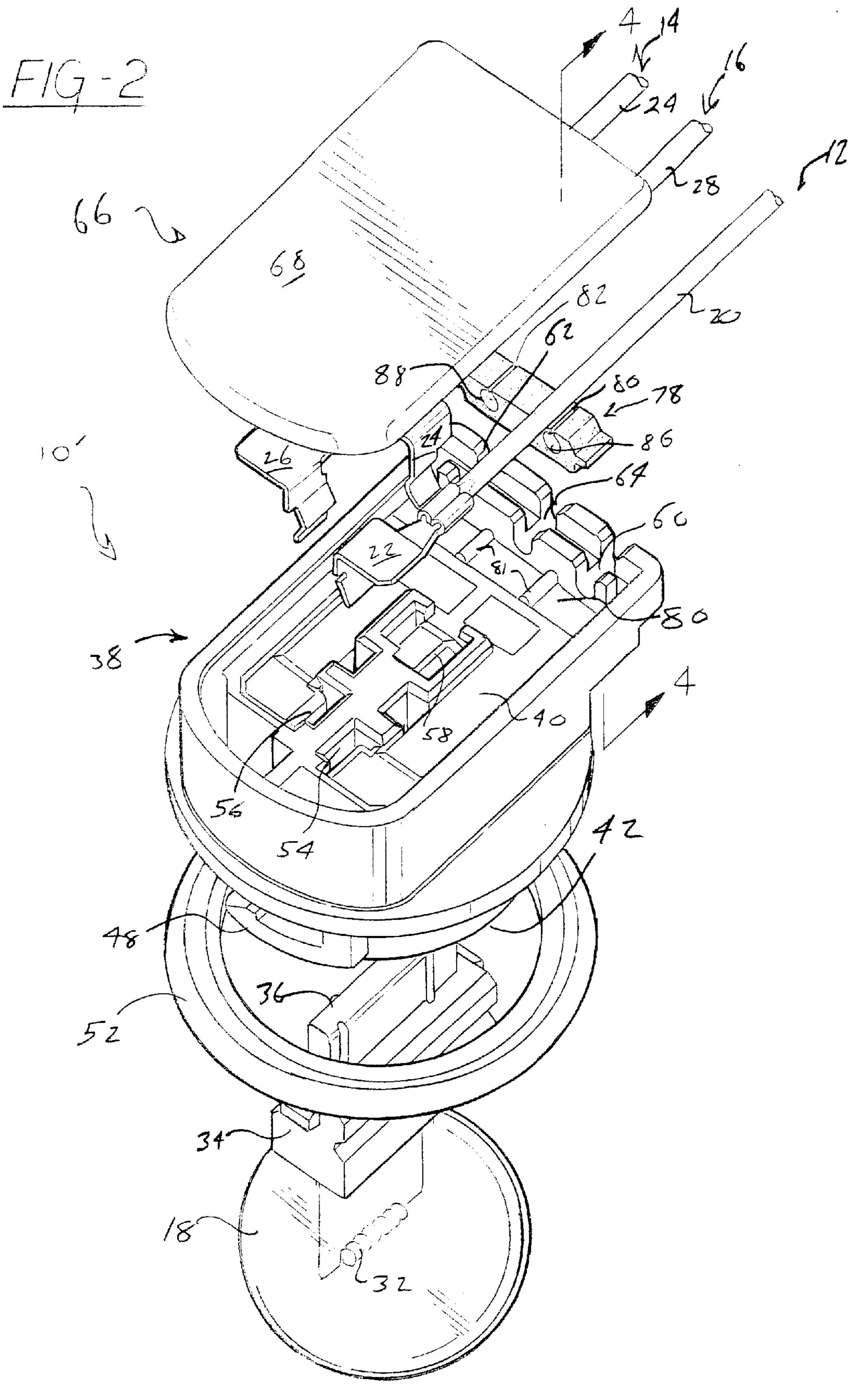
FIG. 2 is further and rotated exploded view of the vehicle lamp assembly and better illustrating the open facing side of the main housing and the manner in which the wire insulating portions and end connector portions of the terminals are engaged within the housing.

Referring now to FIGS. 1 and 2, first 10 and second 10' exploded and rotated views are illustrated of a lamp assembly for use with a vehicle's electrical system. As previously explained, the lamp assembly of the present invention is an improvement over the prior art in that it provides an improved assembly for sealing the interfaces between the vehicle's lamp socket and lighting assembly, as well as between the interface between the terminal wires of the electrical system and the lamp socket. The lamp assembly of the present invention further provides an improved sealing construction with the added feature of substantially reduced part content.

A portion of the vehicle electrical system is illustrated in the form of first 12, second 14 and third 16 terminals. The first terminal 12 corresponds to a right power terminal, the second terminal 14 corresponds to a left power terminal and the third terminal 16 corresponds to a common ground terminal and so that the terminals may deliver a steady current flow to a bulb 18. Each terminal 12, 14, and 16 further includes an elongate extending and wire insulating portion as well as an end connector portion. Specifically, first terminal 12 includes wire insulating portion 20 and end connector portion 22, second terminal 14 includes wire insulating portion 24 and end connector portion 26 and third terminal 16 includes wire insulation portion 28 and end connector portion 30. The vehicle lamp bulb 18 also includes a filament 32, a connector body 34 and a connector insert portion 36 extending from the body and which is engaged within the lamp assembly housing in a manner which will be subsequently described.

A main housing 38 is provided, having a specified shape and size, and is constructed preferably of an elastomeric or plasticized material. The main housing 38 defines a plurality of interior configurations (as will be further described in additional detail) along an open facing side 40. The main housing 38 also includes an oppositely extending socket, defined within an exterior surface provided by an annularly projecting wall 42, and within which the connector body 34 and connector insert portion 36 of the bulb 18 are seatingly engaged.

Referring specifically to FIG. 1, deflectable tang 44 and shelf 46 portions are defined within the interiorly open socket and are provided for resiliently and seatingly engaging the connector body 34 and insert 36 portions of the bulb 18. A plurality of annular projecting ledge portions (see at 48 and 50) extend from the exterior surface annularly projecting wall 42 of the socket and seatingly engages an annular shaped front seal 52. The front seal 52 is preferably constructed of a silicone or like material, having a specified degree of deformability and/or elasticity and which, upon further being seated over the ledge portions 48 and 50 of the socket, provide a degree of water-tight sealing at the interface between the lamp assembly and the bulb 18 and upon the assembly being assembled in place within the vehicle.

Figure 4:
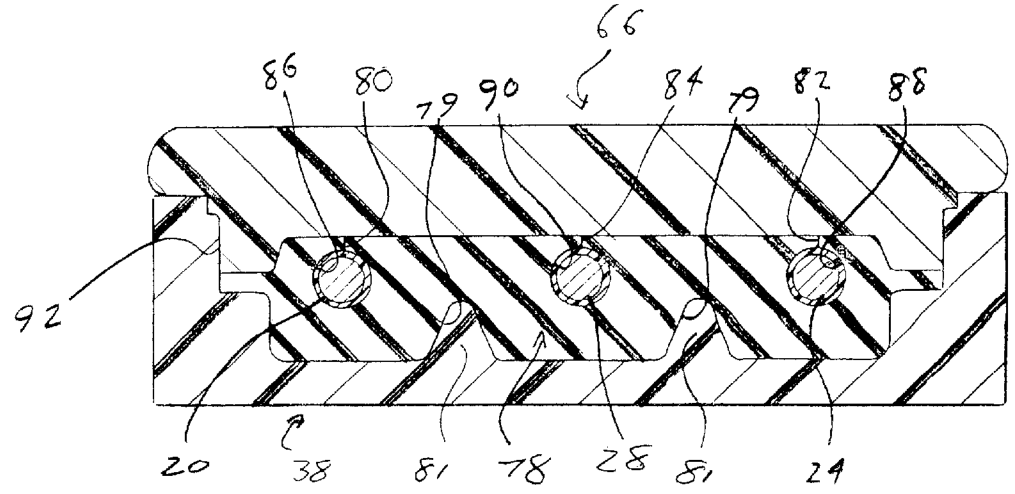
FIG. 4 is a cutaway view taken along line 4—4 of FIG. 2 and illustrating the seal-fight engagement provided by the wire inlet seal and the ultrasonic welding operation of the assembled vehicle lamp.

As is again best shown in the exploded view of FIG. 2, the interior configuration of the main housing includes connector recessed portions 54, 56, and 58 and which, referring further to the assembled view of FIG. 4, illustrates the manner in which the connector insert portions 22, 26 and 30 of the first, second and third terminals, are engaged with the main housing 38. The connector portions 22, 26 and 30, as is known in the art, communicate the current flowing to and from the wire insulating portions 20, 24 and 28 of the right, left and common ground terminals with the connector body 34 and insert portion 36 of the bulb 18.

A plurality of first 60, second 62 and third 64 sealing ridges are defined within the open facing side 40 of the main housing 38 and in proximity to an inlet end of the housing 38 through which the terminals 12, 14 and 16 extend. The sealing ridges 60, 62 and 64 are preferably molded in the main housing 38 during its construction and receive, respectively, specified locations of the wire insulated portions 20, 24 and 28, corresponding to the terminals 12, 14 and 16, in a pressure-fitting and impinging fashion.

A back cap 66 is provided and, similar to the main housing, is constructed of an elastomeric plasticized material. The back cap 66 has a specified shape and includes a first substantially smooth and exterior face 68 (see FIG. 2) and a second interiorly open and mating face 70 (see FIG. 1) which matingly aligns with the open facing side 40 of the main housing 38. A second plurality of first 72, second 74 and third 76 sealing ridges are defined within the open and opposing mating surface 72 of said back cap 68 and which, upon mating assembly, align with the corresponding first plurality 60, 62 and 64 of sealing ridges of the main housing 38 and to sandwich therebetween the fitted locations of the wire insulating portions 20, 24 and 28 of the three terminals (right) 12, (left) 14 and (common ground) 16. As with the first plurality of sealing ridges 60, 62 and 64, the corresponding second plurality 72, 74 and 76 of sealing ridges on the back cap provide an additional degree of pressure fitting and impinging support of the located wire insulated portions 20, 24 and 28 of the inserted terminals.

In addition to the disclosure of the present lamp assembly heretofore presented, additional moisture sealing capability is desired at the location between the wires (terminals) and housing assembly and this is provided by an inlet seal 78. The inlet seal 78 is provided with a specified three-dimensional shape and, similarly to the annular front (bulb) seal 52, is also preferably constructed of a silicone or silicone based material.

During assembly of the lamp assembly the inlet seal 78 is nestingly received within a first laterally extending and recessed location 80 defined in the main housing 38 (see FIG. 2) and which is located in proximity to the sealing ridges 60, 62 and 64 at the terminal inlet end. The recessed location 80 is further defined by spaced projections 81 and which matingly align with corresponding recesses 79 defined in an opposing edge surface of the inlet seal 78. A second laterally extending and recessed location 82 is defined in the end cap 66 (see FIG. 1) and in likewise proximate fashion to its corresponding plurality of sealing ridges 72, 74 and 76.

Figure 3:
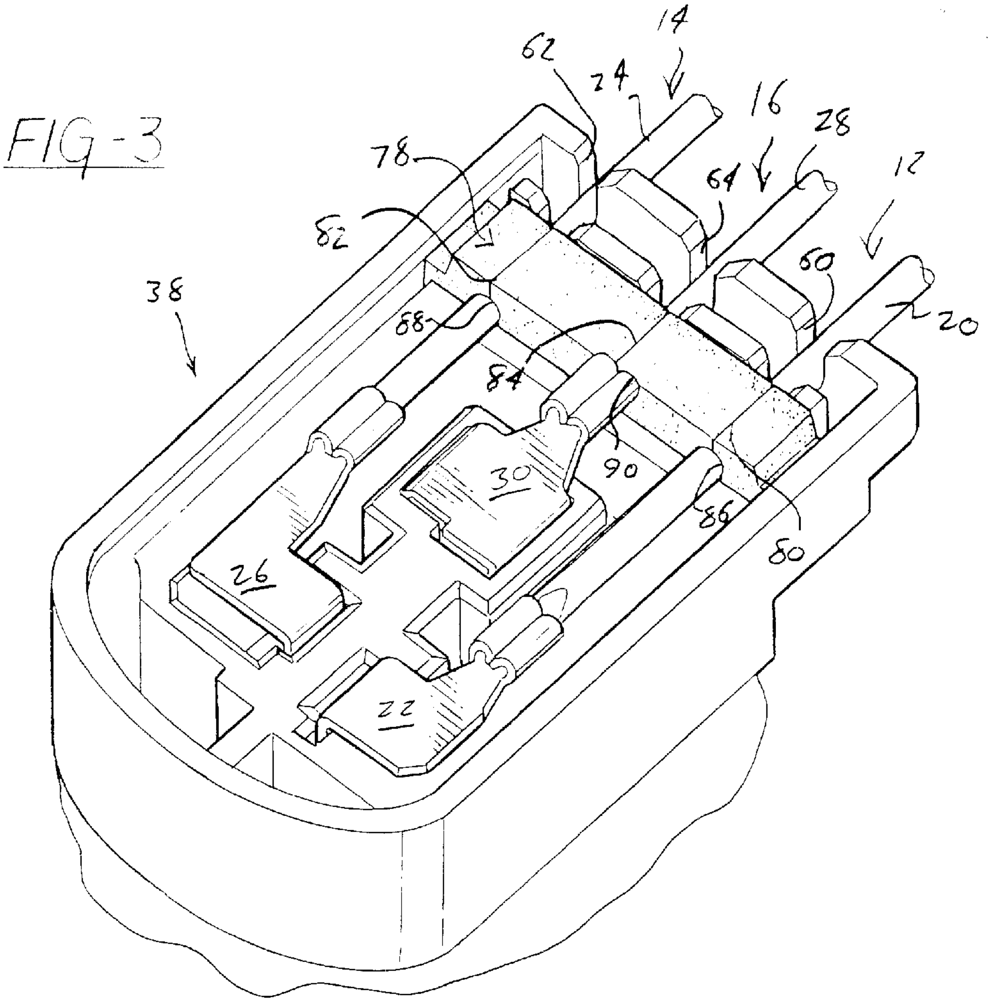
FIG. 3 is an enlarged sectional view of the main housing illustrated in FIG. 2 and showing the terminals secured in place.

The inlet seal 78 further includes a plurality of three opposing and split seal edges 80, 82, and 84, and which in turn communicate, respectively, with each of first 86, second 88 and third 90 wire receiving apertures extending in longitudinally extending fashion through the inlet seal 78. Inserted into the wire receiving apertures 86, 88 and 90 are further specified locations of the wire insulating portions 20, 24 and 28 of the communicating terminals. As best shown in the illustrations of FIGS. 3 and 4, the wire insulating portions 20, 24 and 28 are press-fitted through the split seal edges 80, 82, and 84 and within the associated apertures 86, 88 and 90.

Final assembly of the lamp housing includes the placement of the wire insulating portions 20, 24 and 28 within the sealing ridges and, upon nestingly inserting the inlet seal 78 in the recessed location 80, within the wire receiving apertures 86, 88 and 90 in the fashion previously described and as is further substantially illustrated in FIG. 4. The end cap 66 is then aligningly located and matingly applied over the open facing side 40 of the main housing 38 and so that the additional plurality of sealing ridges 72, 74 and 76 align with the wire inserting portions and the first plurality of sealing ridges along with second recessed location 82 defined in the open and mating face 70 of the end cap 66 likewise nestingly engaging an opposite projecting edge of the inlet seal 78.

Upon completion of the mating assembly described above, it is desirous to establish a moisture proof seal to the assembly and this is provided by the application of ultrasonic (or vibrational) sealing of the boundary location established between the elastomeric constructed end cap 66 and the main housing 38. As is known in the art, ultrasonic welding contemplates the generation of heat resistance at the weld location and due to the frequency of sonic vibration. The equipment necessary to sonically (or vibrationally) weld such elastomeric or plasticized components is, by itself, known in the art and, accordingly, further and general technical disclosure of such a procedure is not required.

In the preferred embodiment of the instant invention, a vibration frequency within the range of 2000 vibrations per second has been found to be ideal for sonically welding a perimeter location, defined at 92 in FIG. 4, and in which the material of the housing and end cap re-melt and re-flow to redefine an integral and one-piece assembly exhibiting the desired water-tight characteristics.

Having described our invention, it is apparent that it discloses a novel and improved lamp assembly for use with a vehicle electrical system and which, in particular, provides the combined attributes of sealing the assembly at both the electrical terminal interface and bulb interface, as well as providing such an assembly with a reduced part count. It is also contemplated that the lamp assembly may be provided in multiple configurations, these including in which the terminal wires exit the lamp socket in a direction perpendicular to a plane established by the bulb filament, as well as with the wires exiting the socket parallel to the filament plane.

Additional preferred embodiments will become apparent to those skilled in the art to which it pertains and without deviating from the scope of the appended claims.

We claim:

1. A lamp assembly for use with a vehicle's electrical system, said lamp assembly comprising:

a main housing having an open facing side and an oppositely extending socket for receiving a bulb;

a plurality of terminals, forming a part of the vehicle's electrical system, each of said terminals including an extending and wire insulating portion and an end connector portion which communicates with said bulb socket;

a first plurality of sealing ridges extending along an open facing side of said main housing and within which are received said wire insulating portions of said terminals;

a back cap matingly aligning over said open facing side of said main housing and sandwiching therebetween said wire insulating portions of said terminals;

a second plurality of sealing ridges defined within an opposing surface of said back cap and which align with said first plurality of sealing ridges to sandwich therebetween said wire insulating portions of said terminals;

a seal disposed at a terminal inlet end of said main housing and said back cap, said seal being nestingly received between aligning recesses defined between said main housing and said back cap and upon mating alignment of said back cap, wire receiving apertures extending through said seal and into which are inserted said wire insulating portions of said terminals; and vibrational sealing means for securing said back cap over said main housing.

2. The vehicle lamp assembly as described in claim 1, said seal further comprising a specified three-dimensional shape and being constructed of a silicone material.

3. The vehicle lamp assembly as described in claim 2, said seal further comprising a plurality of opposing and split seal edges communicating with each of said wire receiving apertures, said wire insulating portions press-fitting through said split seal edges and within said associated apertures.

4. The vehicle lamp assembly as described in claim 1, further comprising a front seal encircle an exterior surface of said socket.

5. The vehicle lamp assembly as described in claim 4, said inlet seal and said front seal each having a specified shape and being constructed of a silicone material.

6. The vehicle lamp assembly as described in claim 1, said terminals including a right power terminal, a left power terminal and a common ground terminal.

7. The vehicle lamp assembly as described in claim 6, further comprising pluralities of three sealing ridges defined, respectively, along each of said main housing and said back cap, said inlet seal further comprising first, second and third wire receiving apertures for receiving, respectively, said first, second and third terminals.

8. The vehicle lamp assembly as described in claim 1, further comprising a plurality of connector recessed portions defined within said open facing side of said main housing and in a direction towards said oppositely extending socket, said recessed portions receiving said connectors in electrically communicable fashion with said bulb socket.

9. The vehicle lamp assembly as described in claim 1, said main housing and said back cap each having a specified shape and being constructed of a durable plasticized material.

10. A lamp assembly for use with a vehicle's electrical system, the electrical system including a plurality of terminals each having a wire insulating portion and an end connector portion, said lamp assembly comprising:

a main elastomeric housing having a socket for receiving a bulb, a front seal encircling an exterior surface of said socket, a first plurality of sealing ridges extending along an open facing side of said main housing and within which are received the wire insulating portions of the terminals, the end connector portions communicating with said bulb socket upon said terminals being located within said main housing;

a back cap matingly aligning over said open facing side of said main housing, said back cap including an opposingly facing side with a second plurality of sealing ridges which align with said first plurality of sealing ridges and sandwich therebetween the wire insulating portions of the terminals;

an inlet seal seatingly received between aligning recesses defined between said main housing and said back cap and proximate said first and second pluralities of sealing ridges, said inlet seal having a specified three dimensional shape and including wire receiving apertures extending in longitudinal fashion through said seal and into which are inserted the wire insulating portions of the terminals; and ultrasonic welding means for sealingly engaging said back cap to said main elastomeric housing.

* * * * *

UNITED STATES PATENT AND TRADEMARK OFFICE

CERTIFICATE OF CORRECTION

PATENT NO. : 6,467,942 B2
DATED : October 22, 2002
INVENTOR(S) : Michael J. Alloway et al.

It is certified that error appears in the above-identified patent and that said Letters Patent is hereby corrected as shown below:

Column 6,
Line 27, insert -- encircling -- delete "encircle".

Signed and Sealed this

Eighteenth Day of October, 2005

JON W. DUDAS
*Director of the United States Patent and Trademark Office*